Oct. 24, 1939.  B. D. JOHNSTONE  2,177,112
VEHICLE FENDER GUARD
Filed Sept. 10, 1937
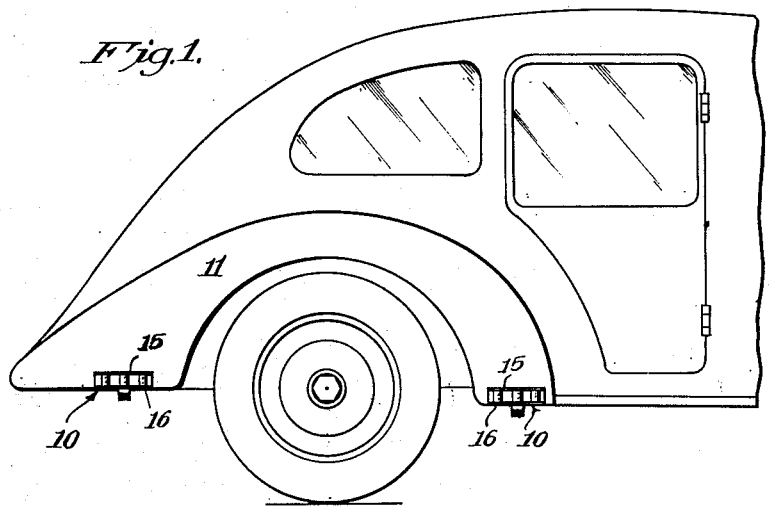
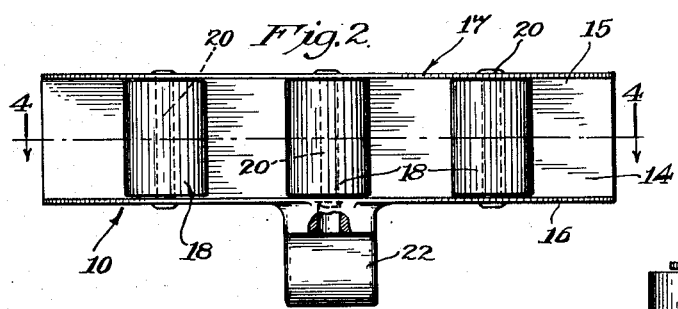
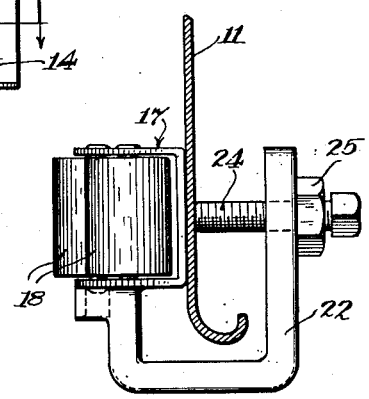
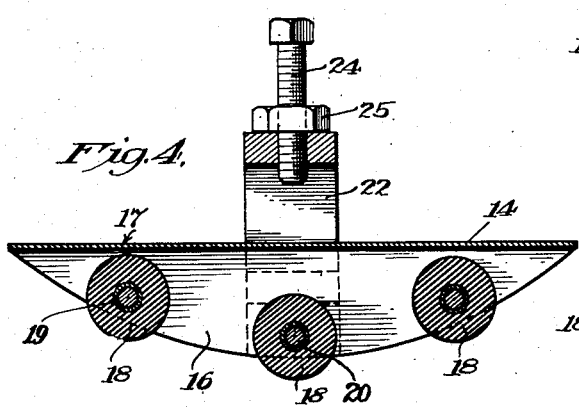
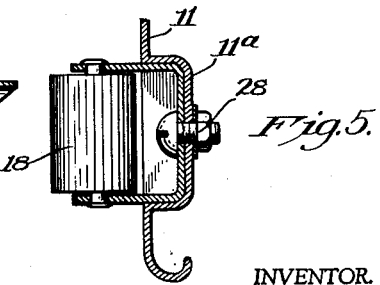
INVENTOR.
Bruce D. Johnstone,
BY Arthur P. Knight and
Alfred W. Knight
ATTORNEYS.

Patented Oct. 24, 1939

2,177,112

UNITED STATES PATENT OFFICE 2,177,112

VEHICLE FENDER GUARD

Bruce D. Johnstone, Los Angeles, Calif., assignor of one-third to James T. Cawthorn and one-third to Carl E. Wyss Application September 10, 1937, Serial No. 163,233

5 Claims. (Cl. 293—55)

The present invention relates to guards or protective devices for the fenders of automotive vehicles. Automobiles of modern designs are provided with fenders over the wheels which have dependent side walls or skirts that more or less cover the wheel in order to enhance the beauty and streamline characteristics of the automobile bodies.

The general trend in design toward lower bodies, together with the tendency to enlarge the fenders and bring their lower margins farther down around the wheels, have combined to bring the edges of the fenders relatively close to the ground. This has created an undesirable situation in that minor damage to the fenders is frequently caused when parking an automobile by striking the fender a glancing blow against a high curb. Formerly in parking a vehicle by the side of the street or highway, the tire on the wheel was usually the only portion of the automobile to come in contact with the curb or any other object, such as a post or fence, along the side of the street, but the fenders of present-day design project laterally beyond the tire and wheel and, being of insufficient height to clear the usual curb, now become the first point of contact between the car and curb. As will be well understood, no matter how much care is exercised in parking a vehicle, it is almost impossible at times to avoid scratching the fenders against the curb or other objects beside the highway or street, with a result that the paint at the lower margins of the fenders becomes scarred and the fenders themselves often receive minor damage. These injuries, if unrepaired, detract considerably from the appearance of an automobile, and if repaired, represent a continual source of annoyance and expense to the automobile owner.

It is, therefore, a general object of my invention to provide a guard for automobile fenders to protect them against damage caused by scraping them along curbs and similar objects.

It is also an object of my invention to provide a fender guard for this purpose which is easily mounted on and detached from an automobile. This not only permits the installation of the device on an automobile not so equipped when delivered from the factory, but permits the attachment of these guards at points where damage is most likely to occur and makes replacement of worn guards much more simple than would be the case were they permanently installed.

These objects have been attained in a guard made according to my invention by providing a back plate and a pair of spaced top and bottom plates, preferably in the form of an integral body. One or more contact members are rotatably mounted on pins extending between the top and bottom plates in such a position that the peripheries of the contact members extend beyond the plates to engage a curb or like object before the fender hits the curb. Suitable fastening means is provided for detachably fastening the guard to the fender at the most favorable position to protect the fender.

However the above objects and advantages of my invention, as well as other objects and advantages not specifically mentioned, are attained will thus be understood by reference to the following specification and the annexed drawing, in which:

Fig. 1 is an elevation of the rear portion of an automobile showing two fender guards of my invention installed on the rear fender;

Fig. 2 is a front elevation of a fender guard constructed according to my invention;

Fig. 3 is an end elevation of a fender guard showing the method of attachment to a fender;

Fig. 4 is a horizontal longitudinal section on line 4—4 in Fig. 2; and

Fig. 5 is an end elevation of a fender guard showing a variational means of attaching it to a fender which is formed with a recess to receive the guard body.

Fig. 1 shows two fender guards, generally indicated at 10, attached to the lower marginal portion of a fender 11 of an automobile in position to protect the fender. It may be sufficient to provide only one guard on each fender, and of course, the front fenders will have guards attached in the proper position as well as the rear fender shown in Fig. 1.

The device is shown in greater detail in Figs. 2 and 3, and comprises in general back plate 14 and a pair of outstanding top and bottom plates 15 and 16, respectively, the top and bottom plates being attached to and projecting out from the back plate in the same direction. When attached to the automobile, the back plate is normally vertical or substantially so and the vertically spaced top and bottom plates are horizontal or substantially so. As a matter of convenience in manufacture, it is preferred that the top, bottom, and back plates be made integrally in the form of a U-shaped body indicated at 17 with the top and bottom plates representing the outstanding legs of the U. In this case the top and bottom plates are placed respectively at the top and bottom edges of back plate 14, but it will be understood that the device is not necessarily limited to this construction, because the back plate may extend either above or below horizontal plates 15 and 16. In a broad aspect of my invention, back plate 14 is part of the means for mounting the two plates 15 and 16 on the fender and so may be modified greatly or even dispensed with in the form shown if other means for mounting the top and bottom plates on the fender is used.

One or more contact members 18, preferably in the form of rollers, are rotatably mounted on and between the horizontal top and bottom plates of the body in such position that their peripheries extend beyond the edges of the plates 15 and 16 to engage the curb or other object. Each roller is loosely mounted upon a vertically extending pin 20 which forms the axis about which the roller turns, although it is, of course, within the scope of this invention to rigidly attach the rollers to the pins so that the entire roller and pin assembly rotates. Metal sleeves 19 in the rollers may be used to aid free rotation of the contact members. As typical of an economical method of manufacture, the bearing pins 20 are here shown as secured in place by having their ends peaned over against the outside of the top and bottom plates. Of course, the pins may be inclined slightly to the vertical if desired.

Although any suitable means may be provided for detachably securing the guard to the fender, typical preferred means is illustrated in Fig. 3 and comprises U-shaped arm 22 formed integrally at one end with the guard body 17 and carrying at the other end screw 24. As shown in Fig. 3, the lower marginal edge of fender 11 is adapted to be received between the legs of the U-shaped clamp 22 so that the guard body and contact members are held against the outer face of the fender while arm 22 passes around the lower edge and positions screw 24 at the rear side of the fender to grip the fender between back plate 14 and screw 24. A lock nut 25 is provided to hold the screw in a tight position.

Contact members 18 are preferably cylindrical in form or approximately so in order that they may roll against the curb or any other object which they strike to minimize wear upon themselves. They are also preferably made of non-metallic, abrasion-resistant material such as rubber or other material having a resilient or yielding nature, or rubber-impregnated fabric, or various synthetic compounds. However, under certain circumstances it may be desirable to use metal rollers. The advantages of the non-metallic material are that the rollers, because of their somewhat resilient characteristics, resist abrasion and wear longer and also there is no noise or screeching when the rollers contact and scrape over the surface of the curb.

Of course, a single roller 18 may be sufficient at times, but the protection it affords is limited and consequently it is preferred to provide a plurality of rollers, three being a suitable number as shown. The rollers are not arranged in a straight line parallel to back plate 14, but are so arranged that the center roller is farther away from the back plate than the other two. This arrangement has been found to afford greater protection to the fender and better engagement is secured between the guard and curb at various angles of parking. In order to accommodate this arrangement of rollers, the top and bottom plates 15 and 16 have been given an arcuate shape along their outer edge so that all three rollers will have their peripheries extending beyond these top and bottom plates.

In order to secure a large bearing area with constant low bearing pressures between back plate 14 and fender 11, plate 14 is made in a shape complementary to the exterior surface of fender 11. In general, fenders on automobiles have flat or plane external surfaces and consequently in order to adapt the device to the largest number of automobiles, back plate 14 is flat so that its rear face will be in contact over substantially its entire area with the vertical outer face of fender 11. Plate 14 extends out beyond the end rollers 18 to provide a substantial area of contact for the back plate, since the larger the load-transmitting area of the guard body, the less chance there is for indenting fender 11. Under special circumstances, plate 14 can be curved to conform to the shape of fender 11.

Although no such material is shown, it is within the scope of my invention to cover the back surface of plate 14 with a thin layer of non-metallic material of a cushioning nature to act as a gasket or washer to help preserve the finish on the outside face of fender 11, although it has been found unnecessary when the guard body has a sufficiently large bearing area.

As typical of other various means which may be used to detachably secure the guard to a fender, there is illustrated in Fig. 5 fastening means comprising nut and bolt assembly 28 passing through the back plate and fender. In this form the fender 11 has been recessed at 11a to receive the guard body 17 so that the body forms in effect a removable portion of the fender having outstanding legs, between which the contact members 18 are rotatably mounted.

It is, of course, within the scope of my invention to provide the lower edges of fenders with fixed or integral top and bottom plates and mount the rotatable contact bodies between these spaced plates without any back plate 14, but it is preferred that the guard be a unit detachable from the fender, since, being subject to considerable wear, it may need replacement at infrequent intervals and such replacement is more easily and economically effected if the guard body as a whole may be removed and replaced by a new one.

From the foregoing description of a preferred form of my invention, it will be understood that changes and modifications may be made in the construction and arrangement of parts without departing from the spirit and scope of my invention, and consequently it is to be understood that the appended claims are to be broadly construed as illustrative of, rather than limitative upon, my invention.

I claim:

1. A guard for a vehicle fender comprising a body of generally U-shaped cross-section having a back plate of substantial area adapted to lie against and in load-bearing contact over substantially its entire area with a portion of a fender side wall, and a pair of spaced outstanding legs; a contact member rotatably mounted between the legs of the body with its periphery extending beyond the body; and means for detachably fastening the body to a vehicle fender to project therebeyond with the back plate in contact with the outside face of the fender.

2. A guard for a vehicle fender comprising a body of generally U-shaped cross-section having a back plate and a pair of spaced outstanding legs; a contact member rotatably mounted between the legs of the body with its periphery extending beyond the body; and means for detachably fastening the body to a vehicle fender to project therebeyond with the back plate in contact with the outside face of the fender, said fastening means comprising a U-shaped arm integral with the body and adapted to pass around the edge of the fender, and a screw in said arm positioned to grip the fender between it and the back plate.

3. A guard for a vehicle fender comprising a body of generally U-shaped cross-section having a flat back plate of substantial area adapted to lie in load-bearing contact over substantially its entire area with a portion of a vehicle fender, and a pair of spaced outstanding legs integral with the back plate; three generally cylindrical members of a non-metallic abrasion-resistant material rotatably mounted between said body legs with their peripheries extending beyond the outer edges of the legs and with the axis of the center cylindrical member at a greater distance from the back plate than the axes of the other two members; and clamp and screw means for detachably fastening the body to a marginal portion of a vehicle fender having a substantially flat outer surface against which the back plate is held in contact so the body projects beyond the fender.

4. The combination with an automobile fender having an outer side face the lower margin of which is subject to being scraped against fixed objects as when the vehicle is being parked, of a body adapted to be received in a recess in the fender at the side face, said body having spaced top and bottom members; a plurality of contact members rotatably mounted on substantially vertical axes between the top and bottom members with their peripheries extending horizontally from the recess beyond the side wall of the fender; and fastening means for attaching the body in the recessed portion of the fender.

5. A guard for a vehicle fender comprising a body of generally U-shaped cross-section having a flat back plate of substantial area adapted to lie in load-bearing contact over substantially its entire area with a portion of a vehicle fender, and a pair of spaced outstanding legs integral with the back plate; three generally cylindrical members of a non-metallic abrasion-resistant material rotatably mounted between said body legs with their peripheries extending beyond the outer edges of the legs and with the axis of the center cylindrical member at a greater distance from the back plate than the axes of the other two members; and means for detachably fastening the body to a portion of the fender having a substantially flat surface against which the back plate is held in contact so the cylindrical members project beyond the fender.

BRUCE D. JOHNSTONE.